US012568978B2

(12) United States Patent
Bosmans et al.

(10) Patent No.: US 12,568,978 B2
(45) Date of Patent: Mar. 10, 2026

(54) PHOSPHATE-FREE BAKING POWDER

(71) Applicant: PURATOS NV, Groot-Bijgaarden (BE)

(72) Inventors: Geertrui Bosmans, Berchem (BE);
Bram Pareyt, Kruisem (BE)

(73) Assignee: PURATOS NV, Groot-Bijgaarden (BE)

( * ) Notice: Subject to any disclaimer, the term of this patent is extended or adjusted under 35 U.S.C. 154(b) by 272 days.

(21) Appl. No.: 18/283,024

(22) PCT Filed: Apr. 27, 2022

(86) PCT No.: PCT/EP2022/061186
§ 371 (c)(1),
(2) Date: Sep. 20, 2023

(87) PCT Pub. No.: WO2022/229253
PCT Pub. Date: Nov. 3, 2022

(65) Prior Publication Data
US 2024/0164389 A1 May 23, 2024

(30) Foreign Application Priority Data
Apr. 27, 2021 (BE) .................................. 2021/5325

(51) Int. Cl.
| | |
|---|---|
| *A21D 8/04* | (2006.01) |
| *A21D 2/02* | (2006.01) |
| *A21D 2/14* | (2006.01) |
| *A21D 2/18* | (2006.01) |
| *A21D 10/04* | (2006.01) |

(52) U.S. Cl.
CPC .............. *A21D 8/042* (2013.01); *A21D 2/02* (2013.01); *A21D 2/145* (2013.01); *A21D 2/181* (2013.01); *A21D 10/04* (2013.01)

(58) Field of Classification Search
CPC ................................ A21D 8/042; A21D 10/04
See application file for complete search history.

(56) References Cited

U.S. PATENT DOCUMENTS

| | | | |
|---|---|---|---|
| 2004/0241283 A1 | 12/2004 | Domingues et al. | |
| 2007/0014891 A1* | 1/2007 | Gale ...................... | A21D 8/042 |
| | | | 426/20 |
| 2012/0034343 A1 | 2/2012 | Mikkelsen et al. | |
| 2012/0201928 A1 | 8/2012 | Søe et al. | |
| 2017/0188591 A1 | 7/2017 | Bellido et al. | |
| 2019/0223455 A1 | 7/2019 | Brown | |

FOREIGN PATENT DOCUMENTS

| | | |
|---|---|---|
| AU | 2003 252 858 A1 | 11/2003 |
| CN | 101999588 A | 4/2011 |
| CN | 107156219 A | 9/2017 |
| WO | 1996/039851 A1 | 12/1996 |
| WO | 2010/115754 A1 | 10/2010 |
| WO | 2015/162087 A1 | 10/2015 |
| WO | 2017/221018 A1 | 12/2017 |

OTHER PUBLICATIONS

International Search Report and Written Opinion mailed on Nov. 16, 2022, issued in PCT International Patent Application No. PCT/EP2022/061186.
Revised International Search Report and Written Opinion mailed on Nov. 16, 2022, issued in PCT International Patent Application No. PCT/EP2022/061186.
International Preliminary Examining Authority, "International Preliminary Report on Patentability", mailed on Jun. 26, 2023, issued in PCT International Patent Application No. PCT/EP2022/061186.
Chinese Office Action as Issued on Oct. 30, 2025 in Respect of the Counterpart Chinese Patent Application No. 202280031431.7 and Its English Translation.
Jiang Qingjun, et al., "Preparation of Aluminium-Free Fried Dough Sticks Using Sodium Bicarbonate and Enzyme Preparations", Food and Fermentation Industries, vol. 37, No. 9, pp. 137-142, 2011.

* cited by examiner

*Primary Examiner* — Jenna A Watts

(74) *Attorney, Agent, or Firm* — Amster, Rothstein & Ebenstein LLP

(57) ABSTRACT

The present invention relates to baking powders suitable for use as a phosphate-free leavening agent in baking, more particularly in cakes, comprising baking salt(s) and oxidase (s) of class EC 1.1.3. Also, phosphate-free cake batters or cake products comprising baking salt(s) and oxidase(s) of class EC 1.1.3, and methods to obtain them, are provided herein.

10 Claims, No Drawings

PHOSPHATE-FREE BAKING POWDER

CROSS-REFERENCE TO RELATED APPLICATIONS

This application is a U.S. national stage entry under 35 U.S.C. § 371 of PCT International Patent Application No. PCT/EP2022/061186, filed Apr. 27, 2022, which claims priority to Belgian Patent Application No. 2021/5325, filed Apr. 27, 2021, the contents of each of which are incorporated herein by reference in their entirety.

FIELD OF THE INVENTION

The present invention relates to the field of food processing. More specifically, the present invention relates to leavening agents, more particularly to baking powders used in cakes. The present invention further relates to cake batters and cakes made thereof and to processes to obtain them.

BACKGROUND

Cakes typically comprise flour, sugar, eggs and a fat source (margarine, oil, . . . ) in different ratios, resulting in a wide variety of different types of cakes. Optional ingredients are e.g. emulsifiers, milk powders, (milk) proteins, hydrocolloids, gums, (native and/or chemically or physically modified) starch, cocoa powder, enzymes or aromas.

Aeration of cakes can be achieved by the ingredients used (e.g. baking powder, egg (white), emulsifiers, proteins or peptides, . . . ) and/or by the preparation process (e.g. whipping of the batter). Batter type cakes can be prepared via single or multi stage mixing methods. In the latter method, air cells are beaten into the fat phase during the creaming step, which consists of mixing the fat phase and sugar. In the following steps eggs and flour are added. Pound cake is prepared according to this method. With the former method, all ingredients are mixed at once and air is beaten into the water phase in which other components are being dispersed. Cream cake is an example of cake prepared according to this method.

Foam type cakes, of which sponge cake is an example, contain little if any added lipid sources (solid fat or liquid oil). Their batter is prepared in two steps: first eggs and sugar are beaten to obtain foam and then flour is gently folded into the mixture to avoid loss of included air. Adding surfactants to the recipe allows single step batter preparation.

Chiffon type cakes can be positioned between batter and foam cakes. A batter consisting of flour, egg yolk, oil and water is folded into the egg white foam.

In general, leavening of cakes depends on (i) the amount of air included during the mixing phase, which is i.a. impacted by batter viscosity, (ii) the stabilization mechanisms at the air-water and/or oil-water interphases, and (iii) the action of the baking powder. Furthermore, all of these mechanisms are impacted by the baking temperature profile applied.

For batter type cakes, leavening is largely determined by the baking powder action.

Baking powder is added to chemically leaven the batter. It consists of a baking salt that serves as a carbon dioxide source, and a baking acid to ensure complete decomposition of the baking salt. The baking salt is mostly sodium bicarbonate, but also others, e.g. potassium bicarbonate or ammonium bicarbonate, can be used, their use being very often determined by the moisture content of the finished good. The most common baking acids are sodium acid pyrophosphates (SAPPs). Other acids, e.g. monocalcium phosphate (MCP), calcium acid pyrophosphate (CAPP) or sodium aluminium phosphate (SALP, when regulation allows), can also be applied. The reaction taking place between the baking salt (in below example $NaHCO_3$) and acid (HX) in the batter (at the batter stage and/or during baking) is as follows:

$$NaHCO_3 + HX \rightarrow NaX + H_2O + CO_2$$

It is also possible to obtain leavening of the cake without the presence of an acid. In this case, leavening is caused by the thermal decomposition of the bicarbonate:

$$2NaHCO_3 \rightarrow Na_2CO_3 + H_2O + CO_2$$

However, this only releases half of the available carbon dioxide, making sodium bicarbonate less efficient than when used in combination with a baking acid, or theoretically, requiring double the amount of sodium bicarbonate to obtain the same amount of carbon dioxide. Furthermore, the formed carbonate increases the product pH, which can cause off-flavours and results in darker cake crumb.

The amount of scientific evidence regarding the relationship between the phosphate concentration in the blood stream and cardiovascular diseases and mortality is growing, and this not only for people suffering from chronical kidney failure but also for the general public. This has led to phosphates being under the attention of the European Food Safety Authority (EFSA), but up till now no decision in reducing/removing added phosphates in/from food has been made.

For the European Union, EFSA has defined an unified list of additives that are assessed safe to use in food and are indicated with an E number. E numbers are codes for substances used as food additives for use within the European Union and European Free Trade Association. For phosphate containing baking acids, E numbers are i.a. E450 (i) (SAPP), E541 (SALP), E341(i) (MCP) or E450($vi$) (CAPP).

Based on their increased consciousness regarding food ingredients, and their awareness for what is on the food label, consumers more and more want to avoid E number containing foods. This forces food manufacturers to search for natural ingredients and their derivatives to produce clean(er) label foods which have product characteristics at least comparable to those of the E number containing reference. Some ingredients that contain E numbers, such as $NaHCO_3$, are accepted by consumers because they are conceived as kitchen cupboard references.

The health concerns associated with added phosphates that could lead to their removal from food depending on the EFSA decision, and the search for clean(er) labels by consumers, raise the pressure to remove phosphate containing baking acids from cake products. This is however not straightforward, since these acids have a specific solubility that determines the timing of $CO_2$ production during mixing and/or baking and, therefore, the final volume of the product. They also have a long standing use as reference baking acid in many cake systems. Furthermore, it has been stated that phosphates can interact with proteins, thereby impacting the cake quality (structure) besides their role in $CO_2$ production. Organic acids such as glucono delta-lactone (GDL), cream of tartar, tartaric acid, citric acid, fumaric acid, lactic acid, adipic acid or malic acid, are already used in cake formulation to replace phosphate containing baking acids such as SAPP. The resulting cakes are, however, not always satisfying, since these organic acids often have a high solubility in the liquid phase of the cake batter resulting in too early production and release of $CO_2$ already during the mixing phase and, hence, cakes with smaller volumes.

Using phosphate-based baking powders has also the disadvantage of giving a metallic aftertaste to bakery products. Such aftertaste is generally not appreciated by the consumers.

EP3372086A1 describes the use of a sodium-free baking powder consisting of potassium bicarbonate and coated GDL in batters and baked products including muffins. It also allows preparing cakes without addition of phosphates, although the components in the baking powder still need to be labelled with an E number (in EU).

WO2018/222117A1 describes a cooking composition comprising a chemical leavening agent substitute that consists essentially of edible porous particles which encapsulate and retain a gas during preparation of food products including sponge cakes. Although it allows preparing sponge cakes without baking powder, and therefore without the addition of phosphates, the used gases still need to be labelled with an E number (in EU), making the resulting product not reduced in E numbers.

WO2017/221018A1 describes a leavening agent consisting of an alkali metal (e.g. sodium or potassium) or ammonium bicarbonate, a precipitant (e.g. calcium chloride) and an acidulant (e.g. orthophosphate or pyrophosphate) and use thereof in a baking powder, a self-rising flour or a bakery mix. It is postulated that the precipitant reacts with acid to form water soluble calcium salts. The latter components substantially increase the neutralizing value of e.g. SAPP, thereby allowing large reductions in the amount of or even remove the acidulant needed. However, as they induce an additional component which contains an E number (the precipitant) compared to a normal baking powder, the total amount of E numbers is not reduced.

As discussed above, the prior art does not provide satisfactory solutions for a phosphate-free baking powder with similar leavening effect as the most commonly used baking powder for cake products, consisting of sodium bicarbonate and SAPP, while at the same time reducing the amount of E number containing ingredients.

SUMMARY OF THE INVENTION

It has been found that the combination of an oxidizing enzyme, e.g. glucose oxidase, together with a baking salt, e.g. sodium bicarbonate, functions as a phosphate-free (E number reduced) baking powder, resulting in cakes, e.g. sponge cakes, which contain no added phosphates and show similar visual and textural properties compared to their phosphate containing counterparts.

Accordingly, in a first aspect, the present invention relates to a baking powder composition comprising one or more baking salts and one or more oxidizing enzymes chosen from oxidoreductases of class EC 1.1.3, said oxidizing enzymes being present in an amount between about 500 and about 2500 units of oxidizing enzymes per gram of baking salt.

In a particular embodiment the baking powder composition as disclosed herein provides that the baking powder composition essentially does not comprise added inorganic phosphate-containing acid or salt.

In a particular embodiment the baking powder composition as disclosed herein provides that the baking powder composition does not comprise leavening salts or their corresponding acids chosen from, but not limited to, $H_3PO_4$, $NaH_2PO_4$, $Na_2HPO_4$, $Na_3PO_4$, $KH_2PO_4$, $K_2HPO_4$, $K_3PO_4$, $Ca(H_2PO_4)_2$ (monocalcium phosphate, MCP), $CaHPO_4 \cdot 2H_2O$ (dicalcium phosphate dihydrate, DPD), $Ca_3(PO_4)_2 \cdot H_2O$ (tricalcium phosphate), $Mg(H_2PO_4)_2 \cdot 4H_2O$ (monomagnesium phosphate), $MgHPO_4, \cdot nH_2O$ (n=0-3) (dimagnesium Phosphate, DMP), $Na_2H_2P_2O_7$ (sodium acid pyrophosphate, SAPP), $Na_3HP_2O_7$, $Na_4P_2O_7$ (tetrasodium diphosphate), $K_4P_2O_7$, $Ca_2P_2O_7$, $CaH_2P_2O_7$ (Calcium Acid Pyrophosphate, CAPP), $Na_5P_3O_{10}$, $K_5P_3O_{10}$, $NaH_{14}Al_3(PO_4)_8 \cdot 4H_2O$ or $Na_3H_{15}Al_2(PO_4)_8$ (Sodium Aluminum Phosphates, SALP), $(NaPO_3)n$ (n>3), $(KPO_3)n$ and/or $(CaP_2O_6)n$ (n≥2).

In a particular embodiment the baking powder composition as disclosed herein provides that the baking powder composition further comprises one or more sugars, preferably in an amount between about 0.10 and about 1.0 gram per gram of baking salt.

In a particular embodiment the baking powder composition as disclosed herein provides that the baking powder composition further comprises one or more organic acids, preferably in an amount between about 25.0 and about 100.0 gram per gram of baking salt divided by the neutralizing value of the corresponding organic acid.

In a particular embodiment the baking powder composition as disclosed herein provides that:

said oxidoreductases are chosen from enzymes able to catalyze the oxidation of sugars, preferably chosen from hexose oxidase (EC 1.1.3.5), pyranose oxidase (EC 1.1.3.10) and/or glucose oxidase (EC 1.1.3.4), more preferably glucose oxidase (EC 1.1.3.4);

said baking salts are chosen from any salt that is able to serve as carbon dioxide source in a batter, preferably chosen from sodium bicarbonate, potassium bicarbonate and/or ammonium bicarbonate, more preferably sodium bicarbonate;

said sugars are chosen from any substrate for oxidoreductases of class EC 1.1.3 suitable for use in cakes, preferably chosen from glucose, fructose, sucrose, mannose, xylose, lactose, galactose, maltitol and/or non-reducing sugar(s) that can be reduced to said sugars after enzymatic reaction, more preferably glucose; and/or said organic acids are chosen from any food grade organic acid that becomes soluble in the batter liquid phase during the batter mixing phase and/or during cake baking, preferably chosen from glucono delta-lactone (GDL), cream of tartar, tartaric acid, citric acid, fumaric acid, lactic acid, adipic acid and/or malic acid, more preferably citric acid and/or fumaric acid.

In a particular embodiment the baking powder composition as disclosed herein provides that the baking powder composition further comprises additional ingredients chosen from calcium carbonate, starch(es) and/or flour.

In a further aspect, the present invention relates to a powdered cake mix or premix comprising the baking powder as disclosed herein.

In a further aspect, the present invention relates to a bakery product batter, preferably a cake batter, comprising the baking powder as disclosed herein or the powdered cake mix or premix as disclosed herein.

In a particular embodiment the bakery product batter, preferably a cake batter, as disclosed herein provides that the bakery product batter, preferably a cake batter, further comprises flour, eggs or egg products, sweetening agents or sweeteners and/or fat.

In a further aspect, the present invention relates to a method for preparing a baking powder composition as disclosed herein, comprising the steps of adding together all ingredients.

In a further aspect, the present invention relates to a method for preparing a bakery product, said method comprising the steps of preparing a bakery product batter by mixing bakery product batter ingredients, said ingredients comprising flour(s), eggs, sweetening agent(s) or sweetener(s), and/or fat(s) in combination with the baking powder composition as disclosed herein; and baking the bakery product batter to obtain a bakery product, wherein said bakery product is preferably a cake.

In a further aspect, the present invention relates to a bakery product obtained by the method as disclosed herein, wherein said bakery product is preferably a cake.

In a particular embodiment the bakery product as disclosed herein provides that said bakery product is a sponge cake, chiffon cake, cream cake and/or moist cake, more preferably a sponge cake and/or a cream cake.

In a further aspect, the present invention relates to the use of a baking powder composition as disclosed herein or the powdered cake mix or premix as disclosed herein in bakery product batter, more preferably in a cake batter.

DETAILED DESCRIPTION

Before the present method and devices used in the invention are described, it is to be understood that this invention is not limited to particular methods, components, or devices described as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any method and material similar or equivalent to those described herein may be used in practice or testing of the present invention, the preferred methods and materials are now described.

In this specification and the appended claims, the singular forms "a", "an", "the" include both the singular and the plural, unless the context clearly indicates otherwise.

The terms "comprising", "comprises" and "comprised of" as used herein are synonymous with "including", "includes" or "containing", "contains", and are inclusive or open-ended and do not exclude additional, non-recited members, elements or method steps. Where this description refers to a product or process which "comprises" specific features, parts or steps, this refers to the possibility that other features, parts or steps may also be present, but may also refer to embodiments which only contain the listed features, parts or steps. The terms "comprising", "comprises" and "comprised of" also include the term "consisting of".

The enumeration of numeric values by means of ranges of figures comprises all values and fractions in these ranges, as well as the cited end points.

The terms "about" and "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "about" or "approximately" refers per se has also been disclosed.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The inventors surprisingly found that the combination of an oxidizing enzyme, e.g. glucose oxidase, together with a baking salt, e.g. sodium bicarbonate, functions as a phosphate-free (E number reduced) baking powder, resulting in cakes, e.g. sponge cakes, which contain no added phosphates and show similar visual and textural properties compared to their phosphate containing counterparts. The inventors further surprisingly found that adding a sugar, e.g. glucose, to the phosphate free baking powder further improves its leavening properties. The inventors have also surprisingly found that adding an organic acid, e.g. citric acid, to the phosphate free baking powder further improves its leavening properties. In addition, the use of the combinations as taught herein result in cakes free of metallic aftertaste.

It is therefore a first aspect of the present invention to provide a baking powder that comprises one or more baking salts and one or more oxidizing enzymes chosen from oxidoreductases of class EC 1.1.3. In particular, said oxidizing enzymes are present in an amount between about 500 and about 2500 units, preferably between about 600 and about 2400 units, of oxidizing enzymes per gram of baking salt.

In a particular embodiment the baking powder composition as disclosed herein provides that the baking powder composition further comprises one or more sugars. In particular, said sugars are preferably present in an amount between about 0.10 and about 1.0 gram per gram of baking salt, preferably in an amount between about 0.10 and about 0.80 gram per gram of baking salt.

In a particular embodiment the baking powder composition as disclosed herein provides that the baking powder composition further comprises one or more organic acids. In particular, said organic acids are preferably present in an amount between about 25.0 and about 100.0 gram per gram of baking salt divided by the neutralizing value of the corresponding organic acid.

In a particular embodiment the baking powder composition as disclosed herein provides that the baking powder composition essentially does not comprise added inorganic phosphate-containing acid or salt. In particular the baking powder composition as disclosed herein essentially does not comprise added phosphate-containing acids or salts, and in particular the baking powder composition as disclosed herein essentially does not comprise added phosphates.

In the context of the present invention the expression "wherein said baking powder does not comprise added (inorganic) phosphate-containing acid or salt" essentially means that no phosphate containing ingredient has been purposively added to the baking powder composition. In particular the baking powder composition as disclosed herein does not contain leavening salts (or their corresponding acids) such as Monocalcium Phosphate (MCP, $Ca(H_2PO_4)_2$), Sodium Acid Pyrophosphate (SAPP; $Na_2H_2P_2O_7$), Sodium (acid) Aluminum Phosphates (SALP; $NaH_{14}Al_3(PO_4)_8\cdot 4H_2O$ or $Na_3H_{15}Al_2(PO_4)_8$), Dicalcium Phosphate Dihydrate (DPD; $CaHPO_4$ $2H_2O$), Calcium Acid Pyrophosphate (CAPP, $CaH_2P_2O_7$) and/or Dimagnesium Phosphate (DMP, $MgHPO_4,\cdot nH_2O$ (n=0-3)). More in particular the baking powder composition as disclosed herein provides that the baking powder composition does not comprise leavening salts or their corresponding acids chosen from $H_3PO_4$, $NaH_2PO_4$, $Na_2HPO_4$, $Na_3PO_4$, $KH_2PO_4$, $K_2HPO_4$, $K_3PO_4$, $Ca(H_2PO_4)_2$(monocalcium phosphate, MCP), $CaHPO_4\cdot 2H_2O$ (dicalcium phosphate dihydrate, DPD), $Ca_3(PO_4)_2\cdot H_2O$ (tricalcium phosphate), $Mg(H_2PO_4)_2\cdot 4H_2O$ (monomagnesium phosphate), $MgHPO_4,\cdot nH_2O$ (n=0-3) (dimagnesium Phosphate, DMP), $Na_2H_2P_2O_7$ (sodium acid pyrophosphate, SAPP), $Na_3HP_2O_7$, $Na_4P_2O_7$ (tetrasodium diphosphate), $K_4P_2O_7$, $Ca_2P_2O_7$, $CaH_2P_2O_7$ (Calcium Acid Pyrophosphate, CAPP), $Na_5P_3O_{10}$, $K_5P_3O_{10}$, $NaH_{14}Al_3(PO_4)_8\cdot 4H_2O$ or $Na_3H_{15}Al_2(PO_4)_8$ (Sodium Aluminum Phosphates, SALP), $(NaPO_3)n$ (n>3), $(KPO_3)n$ and/or $(CaP_2O_6)n$ (n≥2).

The skilled person will understand that the baking powder as taught herein may contain (trace) amounts of (organic) phosphate originating from other constituents of the baking powder such as, for example, those used for diluting the baking powder (white plain wheat flour may contain about 0.1-0.2% of phosphate). Such types of phosphates do not have the same physiological effect as the phosphates contained in the common leavening acids/salts, nor they cause a metallic aftertaste in baked products such as cakes. Examples of such phosphates are inositol phosphates, phosphates esterified to amylopectin, etc. Accordingly, the baking powder composition as disclosed herein comprises less than 0.20% of phosphate, more in particular less than 0.10% of phosphate. In a particular embodiment the baking powder composition as disclosed herein provides that the baking powder composition does not comprise inorganic phosphate-containing acid or salt. In particular the baking powder composition as disclosed herein does not comprise phosphate-containing acids or salts, and in particular the baking powder composition as disclosed herein does not comprise phosphates.

In the context of the present invention the term "baking salt" refers to any salt that is able to serve as carbon dioxide source in a batter. Non-limiting examples of baking salts are sodium bicarbonate, potassium bicarbonate and ammonium bicarbonate. Preferred baking salt is sodium bicarbonate.

In the context of the present invention the term "sugar" comprises the wordings "sugars" and "source of sugar(s)" and refers to any substrate for enzymes of class EC 1.1.3 suitable for use in cakes. Non-limiting examples of sugars or sugar alcohols are glucose, mannose, xylose, lactose, galactose and maltitol. A preferred (source of) sugar(s) is glucose. The skilled person will understand that the (source of) sugar(s) may be added under any form such as pure sugar(s) or as sugar(s) containing ingredient(s). Furthermore, the sugar(s) may be added as non-reducing sugar(s) that can become reducing after enzymatic reaction (such as the sucrose/invertase combination liberating glucose and fructose in the dough).

In the context of the present invention the term "organic acid" refers to any food grade organic acid that becomes soluble in the batter liquid phase during the batter mixing phase and/or during cake baking. Non-limiting examples of organic acids are glucono delta-lactone (GDL), cream of tartar, tartaric acid, citric acid, fumaric acid, lactic acid, adipic acid and malic acid. Preferred organic acids are citric acid and fumaric acid. The acid may be added under any form, such as pure acid or as acid containing ingredient (e.g. extract, juice). Furthermore, the acid may be generated after enzymatic reaction. Organic acids as taught herein may be characterized by their neutralizing value. The neutralizing value of an organic acid is well-known in the art and corresponds to the amount (g) of baking salt needed to completely neutralize 100 g of that acid. Some non-limiting examples of neutralizing values are the ones described in the book "Chemical Leavening Agents" by Brose E. Becker G. and Bouchain W., published by H. Schmidt Mainz, 1996. In some cases, it is possible to determine the neutralizing value (NV) of an organic by using the following formula:

$$NV=100\times((MW\ baking\ salt \times number\ of\ reactive\ protons\ of\ the\ acid)/MW\ acid)\ where\ MW\ stands\ for\ molecular\ weight.$$

Some non-limiting examples of neutralizing values used to perform the present invention are particularly the ones given in table A. When more than one type of organic acid is use in the baking powder, their respective amounts are calculated using a rule of three as known in the art.

TABLE A

| | Typical neutralizing values | | |
| Name | Sodium bicarbonate | Potassium bicarbonate | ammonium bicarbonate |
| --- | --- | --- | --- |
| glucono delta-lactone (GDL) | 45 | 54 | 44 |
| cream of tartar | 45 | 54 | 42 |
| tartaric acid | 112 | 133 | 105 |
| citric acid | 131 | 156 | 123 |
| fumaric acid | 145 | 173 | 136 |
| lactic acid (80%) | 74 | 90 | 70 |
| adipic acid | 115 | | |
| malic acid | 125 | | |

In the context of the present invention the term "oxidoreductase of class EC 1.1.3" refers to an enzyme able to catalyse the oxidation of sugars. The Enzyme Commission number (EC number) is a numerical classification scheme for enzymes, based on the chemical reactions they catalyse. Non-limiting examples of oxidoreductases of class EC 1.1.3 are hexose oxidase (EC 1.1.3.5), pyranose oxidase (EC 1.1.3.10) and glucose oxidase (EC 1.1.3.4). A preferred oxidoreductase is glucose oxidase (EC 1.1.3.4). The oxidoreductase may be of any source. Example of suitable sources of oxidoreductases are fungi such as, but not limited to, *Aspergillus niger* or *Penicillium chrysogenum*. More preferably the oxidoreductase of the present invention is a glucose oxidase from *Aspergillus niger*. The amount of oxidoreductase may advantageously be expressed in amount of enzyme units. One enzyme unit is defined as the amount of enzyme that oxidises 1 μmol of substrate (sugar) per min in defined conditions of temperature and pH. The skilled person will understand that the enzyme activity is usually assayed in conditions close to the temperature and pH required for optimal enzymatic activity. For example the activity of the glucose oxidase, more particularly the glucose oxidase of *Aspergillus niger* may be expressed as μmoles of β-d-glucose oxidized in 1 min at 30° C. and pH 5.6. The oxidoreductase of the present invention can be used as pure enzyme, as enzyme on a carrier, or as diluted enzyme.

In a particular embodiment the baking powder composition as disclosed herein provides that:

said oxidoreductases are chosen from enzymes able to catalyze the oxidation of sugars, preferably chosen from hexose oxidase (EC 1.1.3.5), pyranose oxidase (EC 1.1.3.10) and/or glucose oxidase (EC 1.1.3.4), more preferably glucose oxidase (EC 1.1.3.4);

said baking salts are chosen from any salt that is able to serve as carbon dioxide source in a batter, preferably chosen from sodium bicarbonate, potassium bicarbonate and/or ammonium bicarbonate, more preferably sodium bicarbonate;

said sugars are chosen from any substrate for oxidoreductases of class EC 1.1.3 suitable for use in cakes, preferably chosen from glucose, fructose, sucrose, mannose, xylose, lactose, galactose, maltitol and/or non-reducing sugar(s) that can be reduced to said sugars after enzymatic reaction, more preferably glucose; and/or said organic acids are chosen from any food grade organic acid that becomes soluble in the batter liquid phase during the batter mixing phase and/or during cake baking, preferably chosen from glucono delta-lactone (GDL), cream of tartar, tartaric acid, citric acid, fumaric acid, lactic acid, adipic acid and/or malic acid, more preferably citric acid and/or fumaric acid.

The baking powder as taught herein may further comprise additional ingredients. Accordingly, in a particular embodiment, the baking powder composition as disclosed herein provides that the baking powder composition further comprises additional ingredients chosen from calcium carbonate, starch(es) and/or flour. Preferably the additional ingredients are used to dilute the main ingredients of the baking powder. Non-limiting examples of diluents are calcium carbonate, starch(es), flour (wheat flour, corn flour, . . . ). In preferred embodiments the active part of the baking powder is diluted such as the resulting product may be used as a one-to-one replacement of the currently phosphate-containing baking powders.

In a further aspect, the present invention relates to a powdered cake mix or premix comprising the baking powder as disclosed herein. Typically a cake mix comprises all the ingredients of a cake recipe with the exception of water, fat (oil, butter, margarine) and eggs. Typically a cake premix is a cake mix where all or part of the flour and sugar has been removed.

In a further aspect, the present invention relates to a bakery product batter, preferably a cake batter, comprising the baking powder as disclosed herein or the powdered cake mix or premix as disclosed herein. More particularly the baking powder composition as disclosed herein may replace or replaces in a batter the conventionally used phosphate containing baking powder consisting of a blend of a baking salt, e.g. sodium bicarbonate, and a baking acid, e.g. SAPP.

In a particular embodiment the bakery product batter, preferably a cake batter, as disclosed herein provides that the bakery product batter, preferably a cake batter, further comprises flour, eggs or eggs products, sweetening agents or sweeteners and/or fat. Depending on the type of bakery product, some of the ingredients listed here may be optional. For instance, some sponge cake types may not contain fat or oil, vegan cakes will not contain eggs or egg products and sugar free cakes will not contain sugar. The cake batter may be of any type depending of the desired type of cake. Non-limiting examples of cake batters are cake batters for sponge cakes, chiffon cakes, cream cakes and moist cakes. Preferred cakes batters are cakes batters for sponge cakes and cream cakes. Although the types and amounts of ingredients of a cake batter may vary depending on the desired cake type most of the cake batters as taught herein contain flour(s), egg(s), fat(s) and sweetening agent(s). Examples of suitable cake batters may be found in chapter 4 "cake mixing and baking" of the book "Professional baking", 4th edition, by W. Gisslen, 2004, John Wiley 1 Sons Inc, incorporated here by reference.

Accordingly it is an embodiment of the present invention to provide a bakery product batter, preferably a cake batter, that comprises flour, optionally fat, optionally eggs or eggs products, one or more baking salt, preferably in an amount between about 0.10% and about 2.0% (weight/weight of the batter), one or more oxidoreductase of class EC 1.1.3, in an amount between about 500 and about 2500 units of oxidoreductase per gram of baking salt and sweetening agent or sweetener, preferably a sugar that is a substrate for said enzyme of class EC 1.1.3 and more preferably at least in an amount higher than about 0.1 g per g of baking salt.

In another embodiment the bakery product batter, preferably a cake batter, of the invention comprises flour, optionally fat, optionally eggs or eggs products, one or more baking salt, preferably in an amount between about 0.10% and about 2.0% (weight/weight of the batter), one or more organic acid(s), preferably is in an amount between about 25.0 and about 100.0 g per g of baking salt, said amount being divided by the neutralizing value of said organic acid(s), one or more oxidoreductase of class EC 1.1.3, in an amount between about 500 and about 2500 units of oxidoreductase per gram of baking salt, and sweetening agent or sweetener, preferably a sugar that is a substrate for said enzyme of class EC 1.1.3 and more preferably at least in an amount higher than about 0.10 g per g of baking salt.

In a particular embodiment the baking powder composition as disclosed herein provides that the baking powder composition essentially does not comprise added inorganic phosphate-containing acid or salt. In particular the baking powder composition as disclosed herein essentially does not comprise added phosphate-containing acids or salts, and in particular the baking powder composition as disclosed herein essentially does not comprise added phosphates.

The term "flour" as used herein refers to any flour or mixture of flours suitable for preparing cakes. Examples of suitable flours are described in the chapter 2 "flour specification" of the book "The technology of cake making", by E. B. Bennion and G.S.T. Bamford, 1997, Springer Science incorporated here by reference.

The term "fat" as used herein refers to any fat or mixtures of fats with short or unsaturated fatty acid chains that are liquid at room temperature (i.e. oils) and/or to fats that are solids at room temperature. The fat may be of animal and/or plant origin. The fat may be any suitable fat known in the art for preparing cakes. Non-limiting examples of suitable fats are vegetable oil (e.g. soy oil, sunflower oil, palm oil), shortening (e.g. emulsified shortening or non-emulsified shortening), margarine, butter, powdered fat and fat paste.

The phrase "eggs or egg products" as used herein refers to fresh eggs (e.g. egg white, egg yolk, whole egg), liquid eggs, frozen eggs, powdered eggs (e.g. egg white powder, egg yolk powder, whole egg powder, egg albumin powder) or a combination thereof. The eggs or egg products may be pasteurized.

In particular embodiments, the eggs or egg products may be a combination of egg white powder and egg yolk powder.

The phrase "sweetening agent or sweetener" as used herein refers to any food-grade substance with a sweet taste or to mixture thereof. The sweetening agent or sweetener may be any sugar, sugar substitute, or a combination thereof suitable for use in the preparation of cakes. Sweeteners may also be artificial sweeteners. Non-limiting examples of sweetening agent or sweetener are monosaccharides (e.g. fructose, glucose, dextrose and galactose), disaccharides (e.g. sucrose, lactose and maltose), oligosaccharides (e.g. oligofructose, maltodextrin, raffinose and stachyose), polysaccharides, agave nectar, honey, sucralose, Stevia leaf extract, acesulfame potassium (Ace-K), advantamonome, neotame, sucralose and sugar alcohols (e.g. sorbitol, xylitol and mannitol). In particular embodiments, the sweetening agent or sweetener may be present in powdered form or as a syrup.

The skilled person will understand that some sweetening agents or sweeteners as taught herein may serve as a substrate for the one or more oxidoreductases of class EC 1.1.3. As long as the amount of sweetening agent or sweetener being a substrate for the one or more oxidoreductases of class EC 1.1.3. is higher than about 0.1 g per g of baking salt, the skilled person will know that no additional sugar is needed.

In particular embodiments, the bakery product batter, preferably a cake batter, may further comprise one or more emulsifiers. The term "emulsifier" as used herein refers to substances that are used in cake recipes to emulsify the lipid components (oil, shortening, margarine) into the water-phase of the cake batter, to facilitate and/or increase aeration of the batter during mixing and/or for the stabilization and/or the retention of air cells during baking. Non-limiting examples of emulsifiers typically used in cakes are mono- and diglycerides of fatty acids, lactic acid esters of mono- and diglycerides of fatty acids, acetic or lactic acid esters of mono- and diglycerides of fatty acids, diacetyl tartaric acid esters of mono- and diglycerides, polyglycerol monoesters of fatty acids, propylene glycol esters of fatty acid, sodium stearoyl lactylate, polysorbates, sucrose esters of fatty acids and lecithin (canola, soy, sunflower).

The bakery product batter, preferably a cake batter, may further comprise one or more aroma components, flavour components, hydrocolloids (e.g. locust bean gum, guar gum, tara gum, xanthan gum, carrageenan, acacia gum, cellulose, modified cellulose and pectin), reducing agents (e.g. cysteine or glutathione), oxidants, yeast extract, enzyme active soy flour, starches (e.g. native, chemically and/or physically modified), cocoa powder, chocolate, colouring agents, and/or enzymes. The skilled artisan knows how to combine these ingredients to obtain the desired type of cake product.

In particular embodiments, the enzyme may be one or more enzymes selected from the group consisting of amylase, xylanase, lipase, phospholipase, transglutaminase, peptidase and lipoxygenase.

The bakery product batter, preferably a cake batter, may further comprise other non-chemical leavening agents, such yeast or sourdough.

In a further aspect, the present invention relates to a method for preparing a baking powder composition as disclosed herein, comprising the steps of adding together all ingredients.

In a further aspect, the present invention relates to a method for preparing a bakery product, said method comprising the steps of preparing a bakery product batter by mixing bakery product batter ingredients, said ingredients comprising flour(s), eggs, sweetening agent(s) or sweetener(s), and/or fat(s) in combination with the baking powder composition as disclosed herein; and baking the bakery product batter to obtain a bakery product.

In a particular embodiment, the method as disclosed herein provides in a method for preparing a bakery product wherein said bakery product is a cake.

The skilled person knows that the ingredients and the process steps are adjusted depending on the type of cake desired. In the method as taught herein, no special adjustment is required compared to traditional recipes and methods, such as the ones described in in chapter 4 "cake mixing and baking" of the book "Professional baking" (op. cit.).

In a further aspect, the present invention relates to a bakery product obtained by the method as disclosed herein, wherein said bakery product is preferably a cake.

The bakery products obtained according to the method of the present invention contain, in contrast to the counterparts prepared with conventionally used baking powder, no added phosphates and have (at least) one E number less without negatively impacting the taste or other quality aspects, e.g. volume, structure or texture of the product. In a further embodiment, the obtained bakery products contain no added phosphates and have no negative impact on taste or other quality aspects, e.g. volume, structure or texture of the product. The negative metallic aftertaste associated with added phosphates is eliminated in the final bakery products.

In a particular embodiment the bakery product as disclosed herein provides that said bakery product is a sponge cake, chiffon cake, cream cake and/or moist cake, more preferably a sponge cake and/or a cream cake.

The batter and bakery products prepared according to the invention with the baking powder according to the invention can be prepared in a (semi-)industrial or artisanal environment. No adaptations to the batter preparation or the baking processes are required.

In a further aspect, the present invention relates to the use of a baking powder composition as disclosed herein or the powdered cake mix or premix as disclosed herein in a bakery product batter, more preferably in a cake batter.

In preferred embodiments the present invention provides the use of the baking powder according to the present invention to replaces phosphate salt(s) containing baking powders.

The invention will be further illustrated with the following examples, without restricting the scope to the specific embodiments described.

EXAMPLES

Example 1: Sponge Cakes

Baking powders were prepared by blending the dry ingredients of Table 1.

TABLE 1

| % (w/w) | Baking powder 1 (reference) | Baking powder 2* | Baking powder 3 | Baking powder 4 | Baking powder 5 |
|---|---|---|---|---|---|
| sodium bicarbonate | 42.27 | 56.71 | 45.26 | 36.62 | 33.60 |
| SAPP | 57.73 | | | | |
| glucose oxidase from *Aspergillus niger* (contains 2000 units/g) | | | 54.74 | 44.67 | 20.49 |
| Glucose | | | | 18.71 | 8.58 |
| citric acid | | 43.29 | | | 37.33 |
| TOTAL | 100.00 | 100.00 | 100.00 | 100.00 | 100.00 |

*not according to the invention

The compositions of the sponge cake batters are given in Table 2

TABLE 2

| % (w/w) | Batter 1 (reference) | Batter 2 | Batter 3 | Batter 4 | Batter 5 |
|---|---|---|---|---|---|
| pasteurized eggs | 40.54 | 40.54 | 40.54 | 40.54 | 40.54 |
| wheat flour | 26.04 | 25.98 | 25.83 | 25.67 | 25.59 |
| Sucrose | 22.65 | 22.60 | 22.46 | 22.32 | 22.24 |
| Water | 5.41 | 5.41 | 5.41 | 5.41 | 5.41 |
| emulsifier (Multec MS1250, Puratos, Belgium) | 4.31 | 4.30 | 4.28 | 4.24 | 4.24 |
| baking powder 1 | 1.05 | | | | |
| Baking powder 2 | | 1.17 | | | |
| baking powder 3 | | | 1.48 | | |
| Baking powder 4 | | | | 1.82 | |
| Baking powder 5 | | | | | 1.98 |
| TOTAL | 100.00 | 100.00 | 100.00 | 100.00 | 100.00 |

Process mix all ingredients in one phase with a planetary mixer (Hobart type N50) using a whisk for 1 min at speed 1 and 4 min at speed 3, divide the cake batter in baking moulds (400 g batter/mould), bake in a deck oven for 30 min at 180° C., after 2 hours, pack the cakes in plastic bags.

Evaluation of the Cakes

Cake volume and texture parameters are measured 24 h after baking. The cake height is measured by using a calliper. The volume is measured by rapeseed displacement. Measurements are performed in duplicate. Hardness (as opposite of softness), cohesiveness, resilience, springiness and chewiness of the cake crumb are evaluated by Texture Profile Analysis (TPA) of cake crumb samples with a Texture Analyser (TAXT2, Stable Micro Systems, UK). Two consecutive deformations of a cylindrical cake crumb sample (diameter=45 mm, height 40 mm) with a cylindrical probe (diameter=100 mm) with a maximum deformation of 50% of the initial height of the product are performed at a deformation speed of 2 mm/sec and a waiting time between the two consecutive deformations of 3 s. Force, measured by the load cell of the Texture Analyser, is recorded as a function of time. Measurements are performed in quadruplicate.

The hardness is the maximum force needed to apply a fixed deformation of 50% of the initial height of the cake sample.

The cohesiveness is calculated as the ratio (expressed in percentage) between the surface under the second deformation curve (downwards+upwards) and the ratio under the first deformation curve (downwards+upwards).

The resilience is calculated as the ratio (in percentage) between the surface under the first deformation curve when the probe is moving upwards to the surface under the first deformation curve when the probe is moving downwards.

The springiness is calculated as the height (in percentage) of the cake cylinder after the first deformation and 3 s of rest compared to the initial height of the cake cylinder.

The chewiness is calculated as the mathematical product of the hardness, the cohesiveness and the springiness.

Sensorial Analyses

Taste properties of the cakes were evaluated by a panel of cake experts. This expert panel is composed of consumers that have been trained to describe and score the overall taste of a cake and possibly to compare it to similar cakes.

Table 3 lists the cake height and texture properties obtained 24 h after baking and expressed relative to the results of the reference cake that are set to 100, as well as taste observations.

TABLE 3

| | height (mm) | hardness (%) | cohesiveness (%) | resilience (%) | taste |
|---|---|---|---|---|---|
| Cake 1 | 100 | 100 | 100 | 100 | Good but with metallic aftertaste |
| Cake 2 | 95 | 141 | 102 | 103 | Better than 1 (without metallic aftertaste) |
| Cake 3 | 101 | 110 | 100 | 102 | Same as 2 |
| Cake 4 | 104 | 84 | 103 | 112 | Same as 2 |
| Cake 5 | 104 | 88 | 104 | 104 | Slightly better than 2 |

The use of the baking powders as taught herein allows to obtain cakes without added phosphate-containing baking acid with the same or even better properties than the properties of a reference cake made with a phosphate-containing baking acid. The negative metallic aftertaste associated with added phosphates was also not perceived anymore in the cakes comprising the phosphate free baking powder based on sensorial analysis.

Example 2: Cream Cakes

Baking powders were prepared by blending the dry ingredients of Table 4.

TABLE 4

| % (w/w) | baking powder 6 (reference) | Baking powder 7* | Baking powder 8 |
|---|---|---|---|
| sodium bicarbonate | 48.78 | 72.38 | 39.44 |
| glucose oxidase from *Aspergillus niger* (2000 units/g) | | | 31.29 |
| SAPP | 51.22 | | |
| Glucose | | | 14.20 |
| citric acid | | 27.62 | 15.05 |
| TOTAL | 100.00 | 100.00 | 100.00 |

*not according to the invention

The compositions of the cream cake batters are given in Table 5

TABLE 5

| % (w/w) | batter 6 (reference) | Batter 7** | Batter 8 |
|---|---|---|---|
| Tegral Satin Cream Cake w/o baking powder (Puratos, Belgium)* | 52.64 | 52.64 | 52.06 |
| pasteurized eggs | 18.67 | 18.67 | 18.67 |
| Water | 12.00 | 12.00 | 12.00 |
| rapeseed oil | 16.00 | 16.00 | 16.00 |
| baking powder 6 (reference) | 0.69 | | |
| baking powder 7 | | 0.69 | |
| baking powder 8 | | | 1.27 |
| TOTAL | 100.00 | 100.00 | 100.00 |

*cake mix containing sugar, wheat flour, vegetable oils, modified starch, whey powder, salt, wheat gluten, emulsifier, thickener
**not according to the invention Process mix all ingredients in one phase with a planetary mixer (Hobart type N50) using a paddle for 2 min at speed 1 and 2 min at speed 2.

bake the batter (1000 g/mould) in a deck oven for 50 min at 180° C.

after 2 hours, pack the cakes in plastic bags.

Cakes were evaluated as described in example 1. Table 6 lists the cake volume and texture properties obtained 24 h after baking and expressed relative to the results of the reference cake that are set to 100.

TABLE 6

| | volume (mL) | hardness (g) | cohesiveness (%) | resilience (%) |
|---|---|---|---|---|
| cake 6 (reference) | 100 | 100 | 100 | 100 |
| Cake 7 | 97 | 123 | 106 | 102 |
| Cake 8 | 100 | 106 | 105 | 104 |

The use of a baking powder as taught herein allows to obtain cakes with similar volume and texture properties compared to the reference cake containing SAPP and sodium bicarbonate for leavening. The negative metallic aftertaste associated with added phosphates was also not perceived anymore in the cakes comprising the phosphate free baking powder based on sensorial analysis.

Example 3: Moist Cakes

Moist cake batters were prepared using the ingredients listed in table 7.

TABLE 7

| % (w/w) | batter 9 (reference) | batter 10 |
|---|---|---|
| Tegral Moist Cake Yellow w/o baking powder (Puratos, Belgium)* | 49.21 | 48.70 |
| pasteurized eggs | 20.00 | 20.00 |
| rapeseed oil | 20.00 | 20.00 |
| Water | 10.00 | 10.00 |
| sodium bicarbonate | 0.36 | 0.54 |
| SAPP | 0.39 | |
| mono calcium phosphate (MCP) | 0.04 | |
| Glucose | | 0.18 |
| glucose oxidase from *Aspergillus niger* (2000 units/g) | | 0.37 |
| citric acid | | 0.21 |
| TOTAL | 100.00 | 100.00 |

*cake mix containing sugar, wheat flour, whey powder, modified starch, vegetable oils, emulsifier, skimmed milk powder, wheat gluten, salt, thickener, flavouring, colour, enzymes Process mix all ingredients in one phase with a planetary mixer (Hobart type N50) using a paddle for 2 min at speed 1 and 2 min at speed 2.

bake the batter (1000 g/mould) in a deck oven for 50 min at 180° C.

after 2 hours, pack the cakes in plastic bags.

Cakes were evaluated as described in example 1. Table 8 lists the cake volume and texture properties obtained 24 h after baking and expressed relative to the results of the reference cake that are set to 100.

TABLE 8

| | volume (mL) | cohesiveness (%) | resilience (%) |
|---|---|---|---|
| cake 9 (reference) | 100 | 100 | 100 |
| Cake 10 | 97 | 115 | 119 |

The cakes comprising the phosphate free baking powder according to the invention show similar values for volume and improved values for cohesiveness and resilience. The negative metallic aftertaste associated with added phosphates was also not perceived anymore in the cakes comprising the phosphate free baking powder based on sensorial analysis.

Example 4: Chiffon Cakes

Chiffon cake batters were prepared using the ingredients listed in table 9.

TABLE 9

| % (w/w) | batter 11 (reference) | batter 12 |
|---|---|---|
| Tegral Chiffon Cake w/o/baking powder (Puratos, Belgium)* | 40.06 | 39.91 |
| pasteurized eggs | 40.00 | 40.00 |
| oil | 11.67 | 11.67 |
| water | 6.67 | 6.67 |
| sodium bicarbonate | 0.63 | 0.94 |
| SAPP | 0.97 | |
| glucose | | 0.14 |
| glucose oxidase from *Aspergillus niger* (2000 units/g) | | 0.31 |
| citric acid | | 0.36 |
| TOTAL | 100.0 | 100.0 |

*cake mix containing sugar, wheat flour, maize starch, egg white powder, dextrose, modified starch, rice flour, emulsifier, thickener, flavouring.

Process mix all ingredients without oil with a planetary mixer (Hobart type N50) using a whisk for 5 min at speed 3. Add the oil and mix again for 1 min at speed 1.

bake the batter (475 g/mould) in a deck oven for 35 min at 180° C.

shock the mould on a table.

after 2 hours, pack the cakes in plastic bags.

Cakes were evaluated as described in example 1. Table 10 lists the cake height and texture properties obtained 24 h after baking and expressed relative to the results of the reference cake that are set to 100.

TABLE 10

| | height (mm) | cohesiveness (%) | resilience (%) |
|---|---|---|---|
| cake 11 (reference) | 100 | 100 | 100 |
| Cake 12 | 92 | 103 | 101 |

The cakes comprising the phosphate free baking powder according to the invention show similar values for height, cohesiveness and resilience. The negative metallic aftertaste associated with added phosphates was also not perceived anymore in the cakes comprising the phosphate free baking powder based on sensorial analysis.

Example 5: Sponge Cakes (not According to the Invention)

Baking powders were prepared by blending the dry ingredients of Table 11.

TABLE 11

| % (w/w) | Baking powder 1 (reference) | Baking powder 11 | Baking powder 12 |
|---|---|---|---|
| sodium bicarbonate | 42.27 | 61.51 | 28.37 |
| SAPP | 57.73 | | |
| glucose oxidase from *Aspergillus niger* (contains 2000 units/g) | | 6.42 | 56.84 |

TABLE 11-continued

| % (w/w) | Baking powder 1 (reference) | Baking powder 11 | Baking powder 12 |
|---|---|---|---|
| glucose | | 8.59 | 3.96 |
| citric acid | | 23.48 | 10.83 |
| TOTAL | | 100.00 | 100.00 |

The compositions of the sponge cake batters are given in Table 12

TABLE 12

| % (w/w) | batter 1b | batter 11 | Batter 12 |
|---|---|---|---|
| Tegral Biscuit w/o baking powder (Puratos, Belgium)* | 53 | 52.37 | 50.40 |
| pasteurized eggs | 40.54 | 40.54 | 40.54 |
| water | 5.41 | 5.41 | 5.41 |
| baking powder 1 (example 1 - reference) | 1.05 | | |
| baking powder 11 | | 1.68 | |
| baking powder 12 | | | 3.65 |
| TOTAL | | 100.00 | 100.00 |

*cake mix containing sugar, wheat flour, wheat starch, starch, emulsifier, thickener, enzymes The cakes were prepared as described in the example 1.

Evaluation

Compared to the reference cakes (obtained with batter 1b), the cakes obtained with the batter 11 (made with a baking powder composition wherein the amount of glucose oxidase units is lower than 500 units per gram of sodium bicarbonate) have a crumb that has an unappealing more brown colour.

Compared to the reference cakes (obtained with batter 12), the cakes obtained with the batter 12 (made with a baking powder composition wherein the amount of glucose oxidase units is higher than 2500 per gram of sodium bicarbonate) have an unpleasant bitter taste.

Example 6: Cream Cakes (not According to the Invention)

Baking powders were prepared by blending the dry ingredients of Table 13.

TABLE 13

| % (w/w) | Baking powder 13 | Baking powder 14 |
|---|---|---|
| sodium bicarbonate | 61.66 | 28.43 |
| glucose oxidase from *Aspergillus niger* (contains 2000 units/g) | 6.20 | 56.75 |
| glucose | 8.61 | 3.97 |
| citric acid | 23.53 | 10.85 |
| TOTAL | 100.00 | 100.00 |

The compositions of the cream cake batters are given in Table 14

TABLE 14

| % (w/w) | batter 6b (reference) | batter 13 | Batter 14 |
|---|---|---|---|
| Tegral Satin Cream Cake w/o baking powder (Puratos, Belgium)* | 52.64 | 52.73 | 52.03 |
| pasteurized eggs | 18.67 | 18.67 | 18.67 |
| water | 12.00 | 12.00 | 12.00 |
| rapeseed oil | 16.00 | 16.00 | 16.00 |
| baking powder 6 (example 2 - reference) | 0.69 | | |
| baking powder13 | | 0.60 | |
| baking powder 14 | | | 1.31 |
| TOTAL | | 100.00 | 100.00 |

*cake mix containing sugar, wheat flour, vegetable oils, modified starch, whey powder, salt, wheat gluten, emulsifier, thickener The cakes were prepared as described in example 2.

EVALUATION

Compared to the reference cakes (obtained with batter 6b), the cakes obtained with the batter 13 (made with a baking powder composition wherein the amount of glucose oxidase units is lower than 500 per gram of sodium bicarbonate) have a crumb colour that has an unappealing more brown colour and have a reduced springiness.

Compared to the reference cakes (obtained with batter 6b), the cakes obtained with the batter 14 (made with a baking powder composition wherein the amount of glucose oxidase units is higher than 2500 per gram of sodium bicarbonate) have an unpleasant bitter taste and a texture that is less resilient and less cohesive.

The invention claimed is:

1. A baking powder composition comprising one or more baking salts and one or more oxidizing enzymes chosen from oxidoreductases of class EC 1.1.3, said oxidizing enzymes being present in an amount between about 500 and about 2500 units of oxidizing enzymes per gram of baking salt and wherein the baking powder composition essentially does not comprise added inorganic phosphate-containing acid or salt.

2. The baking powder composition according to claim 1, wherein the baking powder composition does not comprise leavening salts or their corresponding acids chosen from $H_3PO_4$, $NaH_2PO_4$, $Na_2HPO_4$, $Na_3PO_4$, $KH_2PO_4$, $K_2HPO_4$, $K_3PO_4$, $Ca(H_2PO_4)_2$ (monocalcium phosphate, MCP), $CaHPO_4.2H_2O$ (dicalcium phosphate dihydrate, DPD), $Ca_3(PO_4)_2.H_2O$ (tricalcium phosphate), $Mg(H_2PO_4)_2.4H_2O$ (monomagnesium phosphate), $MgHPO_4,.nH_2O$ (n=0-3) (dimagnesium Phosphate, DMP), $Na_2H_2P_2O_7$ (sodium acid pyrophosphate, SAPP), $Na_3HP_2O_7$, $Na_4P_2O_7$ (tetrasodium diphosphate), $K_4P_2O_7$, $Ca_2P_2O_7$, $CaH_2P_2O_7$ (Calcium Acid Pyrophosphate, CAPP), $Na_5P_3O_{10}$, $K_5P_3O_{10}$, $NaH_{14}Al_3$ $(PO_4)_8.4H_2O$ or $Na_3H_{15}Al_2(PO_4)_8$ (Sodium Aluminum Phosphates, SALP), $(NaPO_3)n$ (n>3), $(KPO_3)n$ and/or $(CaP_2O_6)n$ (n≥2).

3. The baking powder composition according to claim 1, wherein the baking powder composition further comprises one or more sugars, in an amount between about 0.1 and about 1.0 gram per gram of baking salt.

4. The baking powder composition according to claim 1, wherein the baking powder composition further comprises one or more organic acids, in an amount between about 25.0 and about 100.0 gram per gram of baking salt divided by the neutralizing value of the corresponding organic acid.

5. The baking powder composition according to claim 1, wherein:

said oxidoreductases are chosen from enzymes able to catalyze the oxidation of sugars, chosen from hexose oxidase (EC 1.1.3.5), pyranose oxidase (EC 1.1.3.10) and/or glucose oxidase (EC 1.1.3.4);

said baking salts are chosen from any salt that is able to serve as carbon dioxide source in a batter, chosen from sodium bicarbonate, potassium bicarbonate and/or ammonium bicarbonate;

further comprising sugars chosen from any substrate for oxidoreductases of class EC 1.1.3 suitable for use in cakes, chosen from glucose, fructose, sucrose, mannose, xylose, lactose, galactose, maltitol and/or non-reducing sugar(s) that can be reduced to said sugars after enzymatic reaction; and/or further comprising organic acids chosen from any food grade organic acid that becomes soluble in the batter liquid phase during the batter mixing phase and/or during cake baking, chosen from glucono delta-lactone (GDL), cream of tartar, tartaric acid, citric acid, fumaric acid, lactic acid, adipic acid and/or malic acid.

6. The baking powder composition according to claim 1, wherein the baking powder composition further comprises additional ingredients chosen from calcium carbonate, starch(es) and/or flour.

7. A powdered cake mix or premix comprising one or more baking salts and one or more oxidizing enzymes chosen from oxidoreductases of class EC 1.1.3, said oxidizing enzymes being present in an amount between about 500 and about 2500 units of oxidizing enzymes per gram of baking salt and wherein the baking powder composition essentially does not comprise added inorganic phosphate-containing acid or salt.

8. A method for preparing a baking powder composition according to claim 1, comprising the steps of adding together all ingredients.

9. A method for preparing a bakery product, said method comprising the steps of preparing a bakery product batter by mixing bakery product batter ingredients, said ingredients comprising flour(s), eggs, sweetening agent(s) or sweetener(s), and/or fat(s), in combination with the baking powder composition according to claim 1, and baking the bakery product batter to obtain a bakery product, wherein said bakery product is a cake.

10. A method according to claim 9, wherein the bakery product batter is a cake batter.

* * * * *